United States Patent [19]
Kirsch

[11] 3,812,237
[45] May 21, 1974

[54] BERYLLIUM HYDRIDE CONTAINING STABILIZING AGENTS

[75] Inventor: Warren B. Kirsch, Baton Rouge, La.

[73] Assignee: Ethyl Corporation, Richmond, Va.

[22] Filed: Dec. 17, 1971

[21] Appl. No.: 209,473

Related U.S. Application Data

[63] Continuation-in-part of Ser. No. 775,580, Nov. 8, 1968, abandoned.

[52] U.S. Cl. ............... 423/266, 149/109, 423/645
[51] Int. Cl. .............................................. C01b 6/00
[58] Field of Search ....... 23/204; 423/645, 647, 266

[56] References Cited
UNITED STATES PATENTS
3,577,414  5/1971  Shepherd, Jr. ................. 144/109 X

OTHER PUBLICATIONS
Wood et al., J. Electrochem. Soc., Vol. 104, pp. 29 to 37, (1957), TP 250 A54j.

Coates et al., J. Chem. Soc., (London), 1954, pp. 2526 to 2529, QD1C6.

*Primary Examiner*—Leland A. Sebastian
*Attorney, Agent, or Firm*—Donald L. Johnson; John F. Sieberth; Lewis Hess

[57] ABSTRACT

Beryllium hydride is stabilized against hydrolysis by the addition to the hydride or to the water of a small quantity of a suitable additive. Preferred additives are (1) alkali or alkaline earth metal salts of long-chain aliphatic carboxylic acids, (2) alkali metal salts of inorganic oxy acids, (3) aliphatic or cycloaliphatic alcohols or phenols or (4) alkali metal, magnesium or calcium salts of alkylbenzene sulfonic acids.

10 Claims, No Drawings

BERYLLIUM HYDRIDE CONTAINING STABILIZING AGENTS

REFERENCE TO RELATED APPLICATION

This application is a continuation-in-part of application Ser. No. 775,580, filed Nov. 8, 1968, now abandoned.

This invention relates to a process for the stabilization of beryllium hydride against hydrolysis and to the stabilized product thereof.

Unless otherwise specified, the term "beryllium hydride" as used herein means ether-free beryllium hydride, methods for the preparation of which are disclosed in copending applications Ser. Nos. 392,677 (Kobetz et al., filed Aug. 24. 1964), and 462,788 (Wood, filed June 7, 1965) now U.S. Pat. No. 3,743,710 issued July 3, 1973. All disclosures of these copending applications are incorporated herein as if fully set forth.

In recent years beryllium hydride has found increasing use as a reducing component of jet and rocket fuels. This has come about largely because beryllium hydride, in combination with such standard oxidizers as hydrogen peroxide, has exhibited a specific impulse higher than that obtained by the use of any other combination of reactants.

However, beryllium hydride exhibits a few shortcomings. For one thing, it tends to be quite susceptible to hydrolysis, especially if exposed to strenuous hydrolysis conditions. Moreover, the compatibility of beryllium hydride in different propellant formulations tends to be somewhat erratic and unpredictable. Research work on this incompatibility problem has indicated that the more resistant the beryllium hydride sample is to hydrolysis, the higher is the probability that it will exhibit the desired compatibility. Accordingly, it is desirable to find a way of reducing the susceptibility of beryllium hydride to hydrolysis.

This invention involves, inter alia, the discovery that small amounts of additives will function to reduce the susceptibility of beryllium hydride to hydrolysis.

A preferred embodiment of the invention is beryllium hydride having associated therewith from about 0.05 to about 25 percent by weight, based on the hydride, of: (1) an alkali or alkaline earth metal salt of an aliphatic carboxylic acid, said acid containing from 6 to about 30 carbon atoms in the molecule; (2) an alkali metal salt of an inorganic oxy acid, the central atom of the oxygenated anion of said acid being boron, silicon, phosphorus or sulfur, or a metal of Group VI-B of the Periodic System of the elements; (3) a compound represented by the formula ROH, wherein R is an alkyl, cycloalkyl or aryl radical containing from 5 to about 30 carbon atoms; (4) a compound represented by the formula $R'R''R'''C_6H_2SO_3M$, wherein $R'$ is a saturated alkyl radical containing from about 10 to about 20 carbon atoms, each of $R''$ and $R'''$ is hydrogen or a methyl radical, $C_6H_2$ is a benzene nucleus and M is an alkali metal, magnesium or calcium; or (5) boric acid.

Of the various additives which function to enhance the hydrolytic stability of beryllium hydride, the following constitute the particularly preferred materials: sodium sulfate, disodium hydrogen phosphate, sodium stearate, sodium alkylbenzene sulfonate (especially where the long chain alkyl group contains 12 to 16 carbon atoms), borax, sodium silicate, tetrasodium ethylenediamine tetraacetate, sodium chromate, sodium tungstate, boric acid, tertiary amyl alcohol, secondary amyl alcohol and phenol.

Another aspect of this invention is the process of treating beryllium hydride by the addition thereto of materials of the type described above or of mixtures of such materials, where the components of said mixtures are not mutually incompatible. This can be done, for example, by immersing the beryllium hydride in an aqueous solution of one or more of these materials. Such a treatment reduces the susceptibility of beryllium hydride to hydrolysis, especially hydrolysis caused by exposure to boiling water.

Whenever reference is made herein to the Periodic System this term shall be understood to designate the Periodic Chart of The Elements, copyright, 1959, by the Fisher Scientific Company of Chicago.

This invention will be more fully understood by reference to the following examples wherein, unless otherwise specified, all percentages are by weight.

EXAMPLE I

The apparatus consisted of a 200-ml 3-neck flask provided with a stirrer, a nitrogen flush and a reflux condenser, the upper end of which was connected to a gas buret containing a mixture of white oil and kerosene.

A 1.0-gram sample of unground beryllium hydride was weighted into the flask under dry nitrogen, followed by 75 ml of distilled water. The nitrogen inlet was clamped shut, and the contents of the flask were heated to reflux by means of an oil bath. Reflux was continued for one hour, after which the flask and contents were cooled to ambient temperature. The volume of gas collected in the buret was 630 ml at 27.5°C. and an atmospheric pressure of 761.4 mm of mercury.

The unhydrolyzed portion of the beryllium hydride was then completely decomposed with excess hydrochloric acid, added in small portions. The volume of gas collected during the decomposition step was 3440 ml, reduced to the above conditions.

The present hydrolysis (percentage of the total gas liberated in one hour at 100°C. in water) was, therefore, $630/630 + 3440 \times 100 = 15.5$. This run, in which no additive was employed, served as a control for later experiments. Other control experiments gave hydrolyses of 13 to 16 percent in one hour at 100°C.

EXAMPLES 2 – 15

In the experiments with additives tabulated below, 0.1 gram, equivalent to 0.13 percent, of additive was used with the amounts of beryllium hydride and distilled water specified above.

| Example No. | Additive | % Hydrolysis in 1 Hr. at 100°C. |
|---|---|---|
| 2 | Commercial detergent [1] | 0 |
| 3 | Sodium sulfate | 1.6 |
| 4 | Disodium hydrogen phosphate | 0 |
| 5 | Sodium stearate | 0 |
| 6 | Sodium alkylbenzene sulfonate [2] | 0 |
| 7 | Disodium tetraborate (borax) | 0 |
| 8 | Sodium silicate ($Na_2SiO_3 \cdot 9H_2O$) | 0 |
| 9 | Sodium ethylenediamine tetraacetate | 1.5 |
| 10 | Sodium chromate | 4.5 |
| 11 | Sodium tungstate | 4.8 |
| 12 | Boric acid ($H_3BO_3$) | < 1 |
| 13 | Tert-amyl alcohol | 0 |
| 14 | Sec-amyl alcohol | 0.5 |
| 15 | Phenol | 0.5 |

[1] 0.2 gram of additive used.
[2] Mixed sodium monoalkyl benzene sulfonates wherein average length of alkyl groups is 13.5 carbon atoms and more than 90 percent of alkyl groups contain from 12 to 16 carbon atoms.

The approximate analysis of the commercial detergent was as follows:

| Component | Percent |
|---|---|
| Alkyl benzene sulfonate | 8.5 |
| Sodium tallow alcohol sulfate | 8.5 |
| Sodium tripolyphosphate | 50 |
| Lauric diethanol amide | 2 |
| Sodium silicate | 6 |
| Sodium sulfate | 14.5 |
| Optical brightner | 0.5 |
| Carboxymethylcellulose | 0.4 |
| Water | 9.5 |
| Perfume | 0.1 |
| Total | 100.0 |

When the procedure of Example 3 is repeated, replacing the sodium sulfate with 0.1 gram of sodium molybdate, less than five percent of the beryllium hydride is hydrolyzed.

In view of the wide variations in structure among the substances succesfully tested for the inhibition of beryllium hydride hydrolysis, it is difficult to predict other compositions which may exhibit this utility; and certainly impossible to exemplify every possible compound. Some compounds which are not very different from those tabulated above are without effect or even exhibit adverse effects, while it is probable that others of very different structure may prove highly beneficial. It appears, however, based on the work to date, that suitable additives fall in the following categories (but there are salts or other additives outside these categories which are also suitable).

The first category of additives involves one or a mixture of alkali or alkaline earth metal salts of aliphatic carboxylic acids containing from 6 to about 30 carbon atoms in the molecule.

Examples of this category include: sodium caproate, barium caproate, lithium isocaproate, strontium isocaproate, potassium caprylate, calcium caprylate, rubidium pelargonate, magnesium pelargonate, cesium isoenanthate, magnesium isoenanthate, sodium caprate, calcium caprate, potassium laurate, strontium laurate, rubidium myristate, barium myristate, lithium palmitate, magnesium palmitate, sodium margarate, strontium margarate, lithium stearate, barium stearate, potassium heneicosanoate, magnesium heneiscosanoate, calcium hexacosanoate, sodium hexacosanoate, strontium triacontanoate, lithium triacontanoate, the rubidium and strontium salts of 2-ethyl hexanoic acid, lithium oleate, barium oleate, rubidium hydrosorbate, magnesium hydrosorbate, lithium elaidate, calcium elaidate, cesium 4-tetradecenoate, barium 4-tetradecenoate, sodium 12-hexacosenoate, strontium 12-hexacosenoate, potassium 15-triacontenoate and calcium 15-triacontenoate.

The second category involves alkali metal salts of inorganic oxy acids, the central atom of the oxygenated anion of these acids being a metal of Group VI-B of the Periodic System or boron, silicon, phosphorus or sulfur.

Examples of the second category of additives include: lithium sulfate, potassium sulfite, sodium thiosulfate, rubidium dithionate, cesium hyposulfite, disodium hydrogen phosphite, lithium orthophosphate, sodium metaphosphate, potassium pyrophosphate cesium chromate, potassium dichromate, sodium trichromate, lithium tetrachromate, sodium tungstate, potassium ditungstate, rubidium tritungstate, lithium molybdate, potassium tetramolybdate, sodium paramolybdate, cesium metaborate, sodium orthoborate, potassium biborate, sodium tetraborate, sodium metasilicate, potassium orthosilicate, hexasodium disilicate and hexasodium trisilicate.

A third category of additives comprises one or a mixture of compounds represented by the formula $R'R''R'''C_6H_2SO_3M$. Here $R'$ is a saturated alkyl radical containing from about 10 to about 20 carbon atoms, each of $R''$ and $R'''$ is hydrogen or a methyl radical, $C_6H_2$ is a benzene nucleus and M is an alkali metal, magnesium or calcium. Additives of this category wherein $R'$ contains from about 12 to about 16 carbon atoms are preferred because of the ready availability of such additives as articles of commerce.

Examples of this category include: sodium 2-decyl benzene sulfonate; magnesium 4-dodecyl-2-toluene sulfonate; potassium 6-hexadecyl-2,4-xylene sulfonate; calcium 2-octadecyl-4,6-xylene sulfonate; lithium 3-eicosylbenzene sulfonate; sodium 3-undecylbenzene sulfonate; rubidium 2-dodecyl-4-toluene sulfonate; potassium 4-tetradecyl-2,6-xylene sulfonate; and cesium 4-heptadecyl-3-tolune sulfonate.

Other effective additives are compounds represented by the formula ROH, wherein R is an alkyl, cycloalkyl or aryl radical containing from 5 to about 30 carbon atoms. Among those tested with highly successful results are secondary amyl alcohol, tertiary amyl alcohol and phenol. Also suitable are: 1-methyl hexanol; 1,1-dimethyl hexanol; 1-ethyl decanol; 1-methyl-1-ethyl octanol; 1,1-dimethyl dodecanol; 1-methyl hexadecanol; 1-methyl-1-ethyl eicosanol; 1,1-dimethyl octacosanol; cyclohexanol; ortho methyl cyclohexanol; ortho, meta and para cresols; meta ethyl phenol; ortho propyl phenol; ortho-2-hexadecyl phenol and para tetracosyl phenol.

In fact, there appears to be a virtually limitless variety of possibilities. The suitability of any particular compound can best be determined by testing it by the procedure set forth above in Example 1.

The additives of the present invention stabilize beryllium hydride against hydrolysis at temperatures ranging from ambient temperature to the boiling point of water. However, they are most effective, and their use is most needed, at temperatures between 50° and 100°C.

These additives are efficient stabilizers against hydrolysis when used in amounts ranging from about 0.05 to about 25 percent by weight, based on the beryllium hydride. However, as shown in the above table, 0.2 percent by weight of the additive is sufficient to provide nearly complete protection in most instances. The range from about 0.05 to about 0.2 percent by weight is, therefore, preferred.

It should be noted that the above additives appear to produce permanent effects. That is, beryllium hydride, treated with a solution of the additive and then heated with distilled water, separated and washed, retains its resistance to hydrolysis upon further heating with fresh distilled water.

Beryllium hydride has a highly important utility as a reducing component of jet and rocket fuels. This significance arises from the fact that the beryllium hydride, in combination with a standard oxidizer, exhibits a higher specific impulse than any other known propellant. In order for this high-impulse component to be usable in a fuel, it must be compatible therewith, and capable of prolonged storage without interreaction with the other components of the fuel. The present invention therefore provides a method for improving both the compatibility and the storage stability of propellant grain.

Beryllium hydride stabilized pursuant to this invention may also be used as a source of hydrogen gas inasmuch as it is readily hydrolyzed by mineral acids.

I claim:

1. Beryllium hydride having associated therewith from about 0.05 to about 25 percent by weight, based on the hydride, of: (1) an alkali or alkaline earth metal salt of an aliphatic carboxylic acid, said acid containing from 6 to about 30 carbon atoms in the molecule; (2) an alkali metal salt of an inorganic oxy acid, the central atom of the oxygenated anion of said acid being boron, silicon, phosphorus, sulfur or a metal of Group VI-B of the Periodic System of the elements; (3) a compound represented by the formula ROH, wherein R is an alkyl, cycloalkyl or aryl radical containing from 5 to about 30 carbon atoms; (4) a compound represented by the formula $R'R''R'''C_6H_2SO_3M$, wherein $R'$ is a saturated alkyl radical containing from about 10 to about 20 carbon atoms, each of $R''$ and $R'''$ is hydrogen or a methyl radical, $C_6H_2$ is a benzene nucleus and M is an alkali metal, magnesium or calcium; or (5) boric acid.

2. The composition of claim 1 wherein said beryllium hydride has associated therewith from about 0.05 to about 0.2 percent by weight, based on the hydride, of sodium stearate or tetrasodium ethylenediamine tetraacetate.

3. The composition of claim 1 wherein said beryllium hydride has associated therewith from about 0.05 to about 0.2 percent by weight, based on the hydride, of sodium chromate, sodium tungstate, disodium tetraborate, sodium silicate, disodium hydrogen phosphate or sodium sulfate.

4. The composition of claim 1 wherein said beryllium hydride has associated therewith from about 0.05 to about 0.2 percent by weight, based on the hydride, of secondary amyl alcohol, tertiary amyl alcohol or phenol.

5. The composition of claim 1 wherein said beryllium hydride has associated therewith from about 0.05 to about 0.2 percent by weight, based on the hydride, of boric acid or of a mixture of sodium monoalkyl benzene sulfonates wherein the alkyl radical is a saturated radical containing from about 10 to about 20 carbon atoms.

6. A composition according to claim 1 wherein the amount of the additive is from about 0.05 to about 0.2 percent by weight based on the beryllium hydride.

7. A composition according to claim 1 wherein a substance of group (1) as specified therein is associated with the beryllium hydride.

8. A composition according to claim 1 wherein a substance of group (2) as specified therein is associated with the beryllium hydride.

9. A composition according to claim 1 wherein a substance of group (3) as specified therein is associated with the beryllium hydride.

10. A composition according to claim 1 wherein a substance of group (4) as specified therein is associated with the beryllium hydride.

* * * * *